(No Model.) 2 Sheets—Sheet 1.

H. E. & H. Z. YOUTZ.
DIRECT CENTRAL DRAFT OR DRIVE HAY TEDDER.

No. 588,523. Patented Aug. 17, 1897.

Witnesses:
Inventors:
Harry E. Youtz.
Harvey Z. Youtz.
By Dan'l H. Herr.
their Attorney.

(No Model.) 2 Sheets—Sheet 2.
H. E. & H. Z. YOUTZ.
DIRECT CENTRAL DRAFT OR DRIVE HAY TEDDER.
No. 588,523. Patented Aug. 17, 1897.
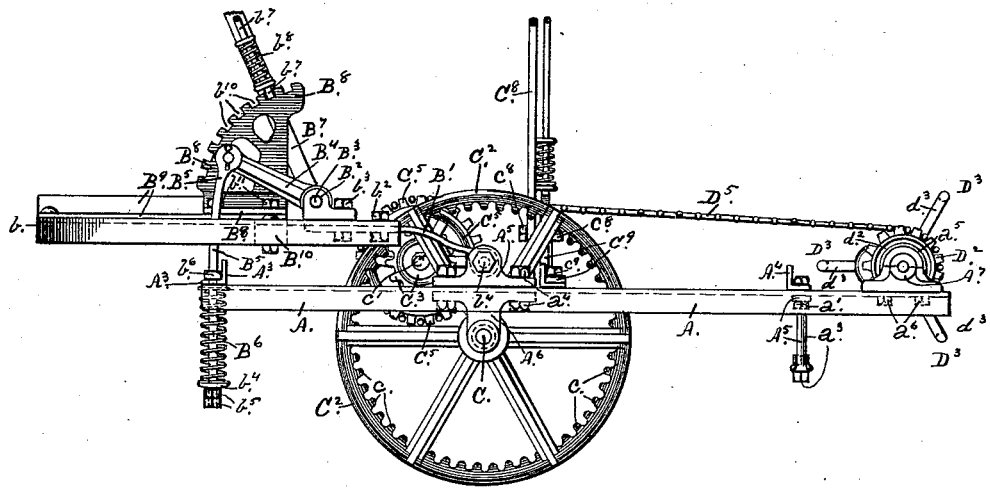
Fig. 3.
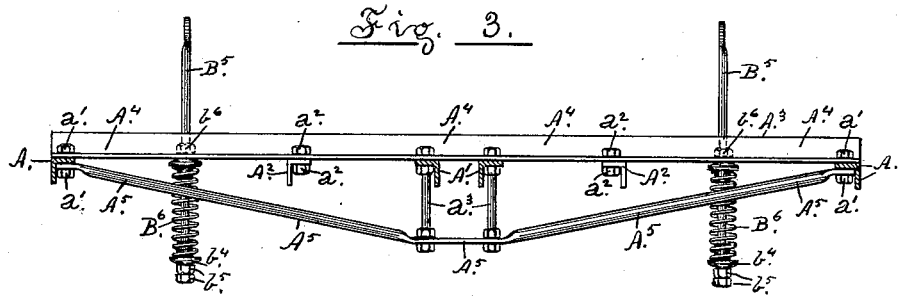
Fig. 4.
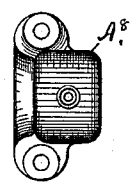 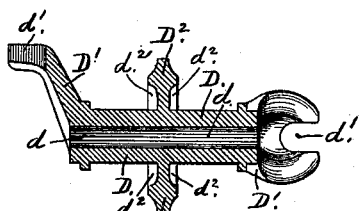 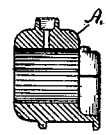
Fig. 6.   Fig. 5.   Fig. 7.
Witnesses:
C. Emlen Urban
Fred P. Mentzer
Inventors:
Harry E. Youtz.
Harvey Z. Youtz.
By Dan'l H. Herr,
their Attorney.

UNITED STATES PATENT OFFICE.

HARRY E. YOUTZ AND HARVEY Z. YOUTZ, OF MOUNTVILLE, PENNSYLVANIA.

DIRECT CENTRAL DRAFT OR DRIVE HAY-TEDDER.

SPECIFICATION forming part of Letters Patent No. 588,523, dated August 17, 1897.

Application filed June 5, 1896. Serial No. 594,398. (No model.)

*To all whom it may concern:*

Be it known that we, HARRY E. YOUTZ and HARVEY Z. YOUTZ, citizens of the United States, residing at Mountville, in the county of Lancaster and State of Pennsylvania, have invented certain new and useful Improvements in Direct Central Draft or Drive Hay-Tedders; and we do hereby declare the following to be a full, clear, and exact description of the invention, such as will enable others skilled in the art to which it appertains to make and use the same.

This invention relates to improvements in hay-tedders of that class in which a series of forks or kicker-bars are so mounted and operated as to raise, turn, and throw the grass over which they are moved and in contact with which they come in separate tufts or bunches and at different times.

The object of the invention is to provide a central draft or drive to the mechanism which rotates or drives the kicker-bar shaft and in arranging springs with the supporting and drawing frameworks to relieve the kicker-bars when they come in contact with fixed obstructions while performing their functions.

The elements of the invention will severally and at large appear in the following description and will severally and collectively be set forth in the claim.

The purposes of the invention are attained by the mechanism and devices illustrated in the accompanying drawings, similar reference-letters designating like parts throughout the several views, in which—

Figure 1:
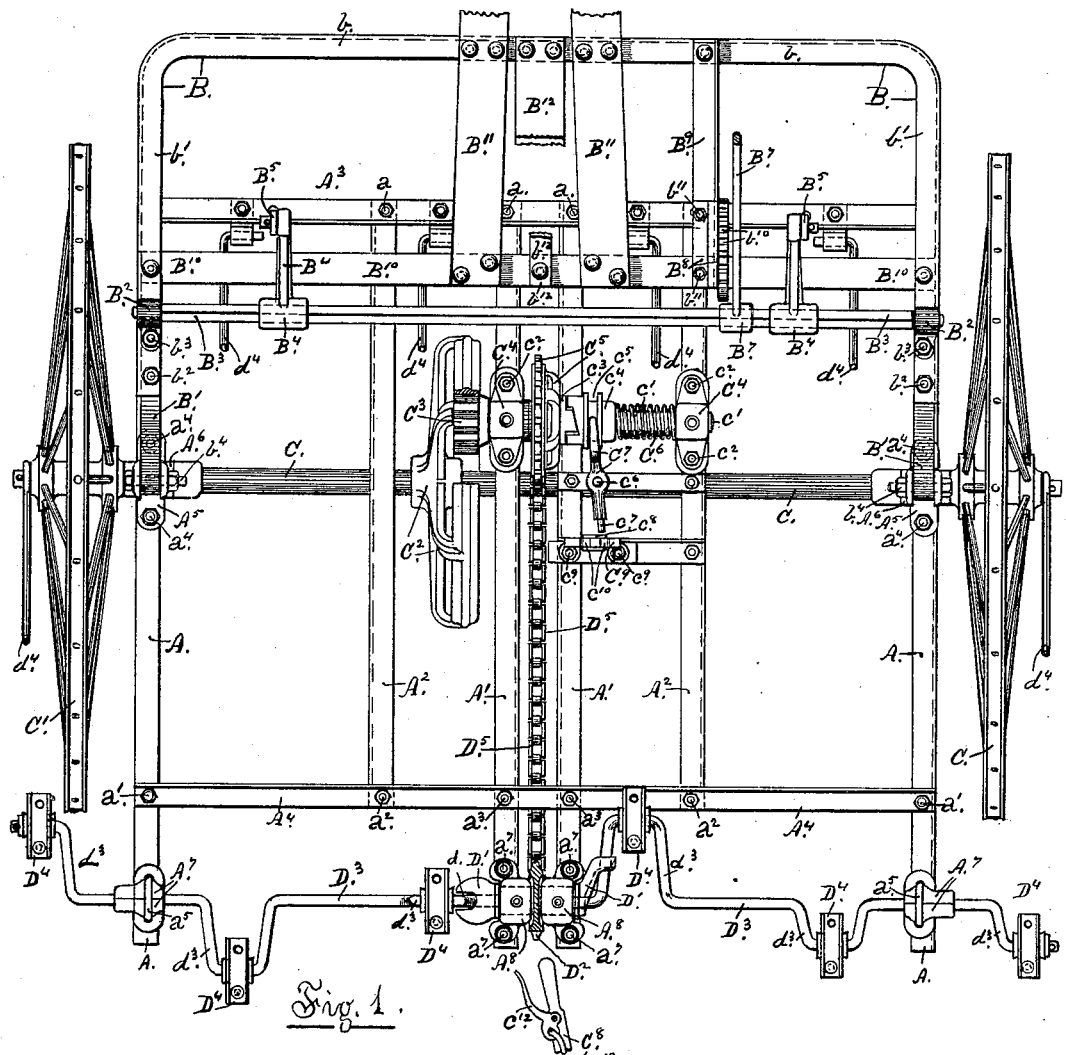
Figure 2:
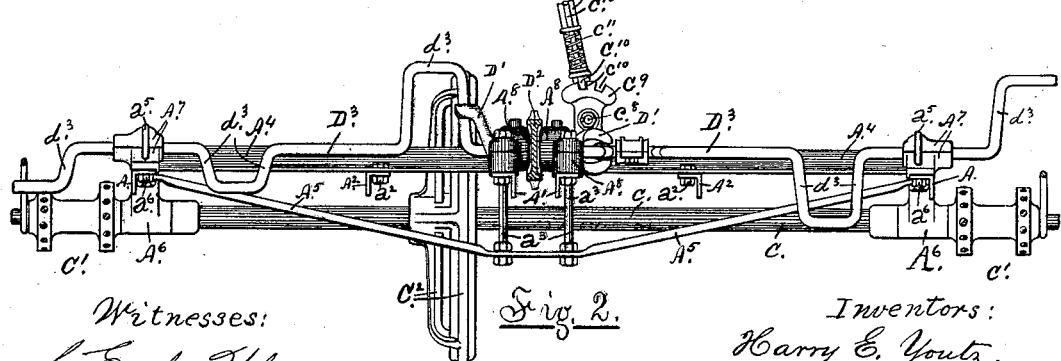

Figure 1 is a direct plan of a hay-tedder embodying the elements of the invention with portions removed; Fig. 2, an elevation from below of Fig. 1 with portions omitted, showing the clutch-adjusting lever in place and the rearward sprocket-wheel in section; Fig. 3, an elevation from the left of Fig. 1 with portions omitted, but the clutch-adjusting lever in place; Fig. 4, a view showing the truss bar or beam in full side elevation as it appears in Fig. 1 viewed from below with the side and central bars of the supporting-framework appearing in vertical section, the intermediate bars in rear end view, and the relieving-springs with their connecting-rods in place; and Figs. 5, 6, and 7 are enlarged views showing details in the construction.

The supporting-framework of the tedder, of any approved size and practically square in form, is preferably made of angle-iron of any suitable width and thickness, and it consists of two side bars A A, having a prescribed length, two central bars $A'$ $A'$, having the same length, and two intermediate bars $A^2$ $A^2$, having a length a prescribed distance shorter than these, all parallel to each other, at prescribed distances apart, and situated in the same plane, with their forward ends arranged in the same line and having secured to said ends, with its under face resting thereon, a cross-bar $A^3$, as by bolts and nuts $a$, as shown. Even with the rearward ends of the shorter bars $A^2$ $A^2$ and its under face resting on the upper faces of all of these bars is a bar $A^4$, similar to $A^3$ and parallel thereto, while underneath is arranged a tension or brace rod $A^5$, extending from side to side of the framework, with its extremities abutting against the downwardly-projecting flanges or sides of the bars A, and headed bolts $a'$, passing through said rod ends and bars, with nuts screwed home thereon, serving to bind them together, while headed bolts and nuts $a^2$ serve to secure these rearward ends of the bars $A^2$ $A^2$ to the bar $A^4$, and the bars $A'$ $A'$ are secured to the said bar $A^4$ in being compressed between pairs of nuts on the upper ends of tension-bolts $a^3$, passing through said bars, said bolts having the required length and their lower ends passing through the rod with nuts thereon, between which said rod is held in place.

Against the upper and under faces of the side bars A, at prescribed points thereof, are placed the bases of the pivot-lugs or bearing-blocks $A^5$ $A^6$, disposed in pairs on each side of the framework, one pair being secured to each side bar by headed bolts and nuts $a^4$ $A^5$ above and $A^6$ below and so arranged that their axial centers will lie in the same vertical plane. Onto the upper faces of the rearward extensions of the bars A are placed the bases of bearing-blocks or journal-boxes $A^7$ $A^7$ for the outer ends of the kicker-shaft, one being secured to each bar by a loop or staple $a^5$, with nuts $a^6$ on the threaded ends of its arms and screwed home onto the under face of said bar, while onto the upper faces of the rearward extensions of the bars $A'$ are placed the bases of the bearing-blocks or journal-boxes $A^8$ $A^8$ for the kicker-bar-rotating crank-shaft and secured to said bars by headed bolts $a^7$, with nuts on their threaded ends screwed home thereon.

In the drawing or draft framework, B designates a practically U-shaped base, also preferably made of angle-iron, comprising the cross-beam $b$, extending across the width of the supporting-framework, with its rearwardly-bent arms or wings $b'$ $b'$ extending in parallel lines and situated above in the vertical planes of the side bars A of the supporting-framework. To the rearward ends of these wings, on the under sides thereof, are rigidly secured, as by headed bolts and nuts $b^2$ $b^3$, the forward ends of straps or links B' B', having transversely-placed eyes in their rearward ends, which are placed between upwardly-projecting ears of the lugs $A^5$ and pivoted in place by headed bolts $b^4$, passing through said ears and eyes, with nuts on their threaded ends. The bolts and nuts $b^3$ serve also to hold in place on the wings $b'$ bearing-blocks $B^2$, journaling thereto the extremities of an angular rock-shaft $B^3$, supporting, sleeved thereon, the rear end hubs of lever-arms $B^4$, having pivoted to their forward ends the upper ends of depending link arms or rods $B^5$, of approved length and extending downwardly a prescribed distance through the cross-bar $A^3$, supporting on their bodies below said bar helical or coiled springs $B^6$, with their upper ends abutting against the under surface thereof and their lower ends resting on washers $b^4$, held in place by jam-nuts $b^5$ on the lower ends of the rods, while above said bar said rods are provided with collars or shoulders $b^6$ to engage its upper face, preventing downward progress of the rods therethrough. At a prescribed point, with one end rigidly secured to the rock-shaft $B^3$, is a hand-lever $B^7$, provided with a catch-bolt or latch $b^7$, having a spring $b^8$ to depress and a hand-compress (not shown) to raise the same, said latch or bolt $b^7$ engaging notches $b^{10}$ in a segmental plate $B^8$, secured vertically in position by bolts and nuts $b^{11}$ to the upper face of a strip $B^9$, having its forward end secured on top to the cross-beam $b$ and its rearward end on top to a cross-beam $B^{10}$, whose extremities are rigidly secured to the parallel wings $b'$ $b'$, while $B^{11}$ and $B^{12}$ $b^{12}$ respectively designate portions of the guide-pole or shafts and of the seat-irons rigidly secured on top to the cross-beams $b$ and $B^{10}$.

Through the bearings $A^6$ are journaled, supporting the framework, the ends of a shaft C, having secured to its extremities in any approved manner and outside of said bearings the hubs of wheels C', carrying the tedder and rotating said shaft. At a prescribed point between said wheels and rigidly secured to said shaft is an internal gear-wheel $C^2$, whose teeth $c$ intermesh with those of a pinion $C^3$, rigidly secured to one end of a shaft $c'$, journaled in bearings $C^4$, having their bases secured to the framework by bolts and nuts $c^2$. Mounted loosely on this shaft $c'$ in any approved manner and rotatably between the central bars A' of the framework, as shown, is a sprocket-wheel $C^5$, whose hub is provided with a rigidly-affixed clutch member $c^3$, to be engaged by the corresponding parts of a clutch member $c^4$, movable back and forth on the body of the shaft and made to rotate therewith by the usual feather and groove applied in the manner well known to the trade, and a helical spring $C^6$, surrounding said shaft, being placed between said loose clutch member and the adjacent end bearing of said shaft, with its extremities pressing against the adjacent faces of the clutch and bearing, holding the members of the clutch in close or operative engagement. To ship or break said engagement, the loose member of the clutch is provided with a peripheral groove or channel $c^5$, engaged by inwardly-projecting pins from the forward ends of the prongs of a shipper-lever $C^7$, centrally pivoted to the framework, as shown, by a pivot pin or screw, as $c^6$, and whose rearward end $c^7$ is engaged by the lower end of a hand-lever $C^8$, pivoted at the required point, as $c^8$, of a standard $C^9$, whose base is secured to the framework, as shown, by bolts and nuts $c^9$, and whose upper edge, being a circular arc from said pivot-center, is provided with notches $c^{10}$ $c^{10}$, and by engaging said notches the lower end of a latch-bolt $C^{10}$, mounted thereon, as shown, serves to hold said lever in fixed positions, indicating that the clutch members are in either closed or open positions, said latch-bolt being provided near its lower end with a spring $c^{11}$, forcing said end into engagement with said notches, and at the upper end thereof with a hand-compress $c^{12}$, raising it from said engagement.

Journaled in the bearing-boxes $A^8$, before mentioned, is a shaft D, provided with an axial bore $d$ and having approved crank-arms D', with notches $d'$ in their outer ends at the extremities thereof and a sprocket-wheel $D^2$ integral therewith or rigidly secured thereto at its center. These arms are shown as being set in perpendicular planes, or ninety degrees apart; but they may be oppositely disposed or they may have any approved degree of angular inclination with each other, while in the sides said sprocket-wheel $D^2$, within its peripheral rim, are formed recesses $d^2$ $d^2$, which the adjacent inner edges of said bearing-boxes enter when said shaft D is journaled in position. The kicker-shaft consists of two branches or sections $D^3$ $D^3$, provided with crank arms or folds $d^3$, three to each section, being set in axially-intersecting planes one hundred and twenty degrees inclined. The sections are exact counterparts of each other, but oppositely disposed, having their inner ends inserted and secured, as by pinning into the axial bore $d$, before mentioned, with the adjacent side bars of the nearest crank-folds in the notches $d'$ of their respective crank-arms D'. The folds $d^3$ have pivoted thereon the kicker-bar-carrying blocks $D^4$, and $d^4$ designates the lower end portions of rods which pivotally connect the upper ends of the kicker-bars to the tedder; but the kicker-bars, with their forks and springs, as well as their upper end connections, being old and well known to the trade and forming no part of the invention, are omitted in the drawings. $D^5$ designates a chain mounted on the sprocket-wheels $C^4$ and $D^2$, whereby the motion of the former rotates the latter, operating the kicker-shaft.

Now with the several parts hereinbefore described occupying the positions indicated in the drawings, an inspection thereof clearly shows, first, that the cross-bar $A^4$, being on top and secured to the supporting-framework as shown, with the brace-rod $A^5$ underneath and also secured thereto as shown and described, constitutes the truss-beam of the invention, stiffening and strengthening it rearwardly, where the strain is greatest by reason of the jerking rotation of the kicker-bar in performing its functions; second, that the tedder-framework and all its attached mechanism is practically centrally balanced on the axle pivot-center, which is below said framework, and the pivot-center of the drawing-framework being situated above in the same perpendicular plane both pivots will work or move harmoniously together; third, that by reason of said pivot-centers being in the same perpendicular plane the hand-lever $B^7$ and its connections with the cross-bar $A^3$ of the supporting-framework, the forward end of said framework may be raised or depressed at pleasure and held in the desired position by the engagement of the latch-bolt of said lever with the required notch in the segmental plate $B^8$; fourth, that the springs $B^6$ yieldingly carry the forward end of the supporting-framework, giving immediate relief thereto should any of the kicker-forks (not shown) come into contact with some obstruction, such as stump or stone, on the ground over which the tedder passes; fifth, that the sprocket-wheels $C^4$ and $D^2$, with the chain $D^5$ mounted thereon, being located and operated as shown, will yield a central draft or drive from the main or driving axle to the kicker-bar shaft, and, sixth, that by reason of the hand-lever $C^7$ and its connections with the clutch member $c^4$, together with the spring $C^5$, the latch-bolt $C^9$, and the notches $c^{10}$ $c^{10}$, said clutch member $c^4$ may be shipped into and out of engagement with the clutch member $c^3$ of the sprocket-wheel $C^4$ as may be desired and securely held in the required position.

Having now described the invention and ascertained and shown the manner in which its functions are performed, what we consider new, and desire to secure by Letters Patent, is—

The combination in a hay-tedder having a framework such as described, an axle underneath and journaled in bearings secured to the side bars thereof supporting said framework, wheels secured to the extremities thereof rotating said axle, an internal gear-wheel between said bearings and also secured to said axle, an intermeshing pinion with said gear-wheel and secured to one end of a shaft journaled in bearings secured to the top of said framework, with a central-drive sprocket-wheel having a fixed clutch member and rotatably mounted on said shaft, and a loose clutch member movable back and forth thereon with mechanism provided to move the same and hold it in and out of engagement therewith, of a side-recessed sprocket-wheel centrally secured to a tubular kicker-bar shaft journaled in bearings secured on top to the rearward ends of the central bars of said framework and having oppositely or angularly disposed crank-arms at the extremities thereof with the adjacent ends of said bearings within said side recesses, and an endless chain mounted on said sprocket-wheels whereby the rotary motion of the former will centrally drive the latter, all substantially as and for the purpose hereinbefore set forth.

In testimony whereof we affix our signatures in presence of two witnesses.

HARRY E. YOUTZ.
HARVEY Z. YOUTZ.

Witnesses:
 DANL. H. HERR,
 HARVEY B. LUTZ.